(12) United States Patent
Chaskar

(10) Patent No.: US 7,023,820 B2
(45) Date of Patent: Apr. 4, 2006

(54) METHOD AND APPARATUS FOR COMMUNICATING DATA IN A GPRS NETWORK BASED ON A PLURALITY OF TRAFFIC CLASSES

(75) Inventor: Hemant M. Chaskar, Woburn, MA (US)

(73) Assignee: Nokia, Inc., Irving, TX (US)

( * ) Notice: Subject to any disclaimer, the term of this patent is extended or adjusted under 35 U.S.C. 154(b) by 736 days.

(21) Appl. No.: 09/751,014

(22) Filed: Dec. 28, 2000

(65) Prior Publication Data

US 2002/0122432 A1  Sep. 5, 2002

(51) Int. Cl.
*H04Q 7/00* (2006.01)
(52) U.S. Cl. ........................ 370/329; 370/466
(58) Field of Classification Search ............... 370/328, 370/329, 395.2, 395.21, 395.3, 466, 468, 370/412, 428, 392, 395.4; 709/225, 226, 709/230, 232, 235, 238; 455/452–455
See application file for complete search history.

(56) References Cited

U.S. PATENT DOCUMENTS

| | | | | |
|---|---|---|---|---|
| 6,330,614 | B1* | 12/2001 | Aggarwal et al. | 709/236 |
| 6,408,001 | B1* | 6/2002 | Chuah et al. | 370/392 |
| 6,469,998 | B1* | 10/2002 | Burgaleta Salinas et al. | 370/338 |
| 6,483,805 | B1* | 11/2002 | Davies et al. | 370/235 |
| 6,564,059 | B1* | 5/2003 | Cyr et al. | 455/445 |
| 6,621,793 | B1* | 9/2003 | Widegren et al. | 370/230.1 |
| 6,665,273 | B1* | 12/2003 | Goguen et al. | 370/252 |
| 6,680,943 | B1* | 1/2004 | Gibson et al. | 370/392 |
| 6,683,853 | B1* | 1/2004 | Carlsson et al. | 370/237 |
| 6,731,617 | B1* | 5/2004 | Mizell et al. | 370/328 |
| 2001/0025321 | A1* | 9/2001 | Tang et al. | 709/246 |
| 2001/0027490 | A1* | 10/2001 | Fodor et al. | 709/238 |
| 2002/0057699 | A1* | 5/2002 | Roberts | 370/395.32 |
| 2002/0077097 | A1 | 6/2002 | Mizell et al. | |
| 2002/0161914 | A1* | 10/2002 | Belenki | 709/235 |
| 2003/0189900 | A1* | 10/2003 | Barany et al. | 370/229 |
| 2004/0039833 | A1* | 2/2004 | Ludwig et al. | 709/230 |

OTHER PUBLICATIONS

Yu, O.T.W.,Next Generation MPLS-based wireless mobile network, Sep. 23-28, 2000, IEEE, vol. 3, pp. 1193-1198.*

(Continued)

*Primary Examiner*—Chau Nguyen
*Assistant Examiner*—Ian N. Moore
(74) *Attorney, Agent, or Firm*—Banner & Witcoff, Ltd.

(57) ABSTRACT

In a GPRS core network, MPLS-based Label Switched Paths (LSPs) between Serving GPRS Support Nodes (SGSN) and Gateway GPRS Support Nodes (GGSN) are established for different types of traffic across the core network during a traffic engineering phase. The queuing and forwarding treatment offered to packets at internal nodes along these routes are based on DiffServ per-hop behavior (PHB) groups to which each packet is assigned at the edge of the core network, i.e., at SGSN or GGSN. In one embodiment of the invention, PDP messaging that occurs at the time of activation of PDP context can be used to assign the corresponding packet stream to particular LSP and PHB. When an MS changes serving SGSN due to mobility, it is only required to change the label mapping context at a GGSN, thereby allowing subsequent packets targeted to the MS to be routed to new SGSN.

14 Claims, 5 Drawing Sheets

OTHER PUBLICATIONS

Heinanen et al., RFC 2597, Assured Forwarding PHB group, Jun. 1999, IETF, pp. 1-11.*

Jacobson et al., RFC 2598, Expedited Forwarding PHB group, Jun. 1999, IETF, pp. 1-11.*

3GPP, 3rd Generation Partnership Project: Technical Specification Group Services and System Aspects; QoS Concept and Architecture, Release 1999 and Jun. 2000, 3G TS 23.107, V3.3.0, pp. 1-36.*

"An Integrated QoS Architecture for GSM Networks", Mikkonen, et al., 1998 IEEE, pp. 403-407.

"Quality of Service Framework in GPRS and Evolution Towards UMTS", Puuskari, 1998, Nokia, 6 pgs.

"Digital cellular telecommunications system (Phase 2+), General Packet Radio Service (GPRS); Service description; Stage 2 (GSM 03.60 version 6.1.1 Release 1997)", Draft EN 301 344 V6.1.1, Aug., 1998, pp. 1-104.

"Digital cellular telecommunications system (Phase 2+), General Packet Radio Service (GPRS); GPRS Tunnelling Protocol (GTP) across the Gn and Gp Interface (GSM 09.60 version 7.5.0 Release 1998)", Draft ETSI EN 301 347 V7.5.0, Jun., 2000, pp. 1-67.

3rd Generation Partnership Project Technical Specification Group Services and System Aspects; QoS Concept and Architecture (Release 1999), 3GPP, 3G TS 23.107 V3.3.0, Jun. 2000, pp. 1-36.

"Supporting IP QoS on the General Packet Radio Service", G. Priggouris, et al., IEEE Network, pp. 8-17, Sep./Oct. 2000.

Bilgic M. et al.; Quality of Service in General Packet Radio Service (1999) pp 226-231.

Rosen, E., Viswanathan, A., and Callon, R., "Multiprotocol Label Switching Architecture," 61 pages, http://www.ietf.org/internet-drafts/draft-ietf-mpls-arch-07.txt, printed May 2, 2005.

Blake, S., Black, D., Carlson, M., Davies, E., Wang, Z., and Weiss, W., "An Architecture for Differentiated Services," Dec. 1998, 34 pages, http://www.ietf.org/rfc/rfc2475.txt, printed May 2, 2005.

Floyd, Sally and Jacobson, Van, "Random Early Detection Gateways for Congestion Avoidance," IEEE/ACM Transactions on Networking, Aug. 1993, pp. 397-413, vol. 1, No. 4.

* cited by examiner

METHOD AND APPARATUS FOR COMMUNICATING DATA IN A GPRS NETWORK BASED ON A PLURALITY OF TRAFFIC CLASSES

TECHNICAL FIELD

The present invention relates generally to communication systems and, in particular, to a method and apparatus for encoding and decoding pause information, especially with respect to digitized audio.

BACKGROUND OF THE INVENTION

The General Packet Radio Service (GPRS) is an enhancement to the so-called Global System for Mobile Communication (GSM) to provide packet data services to GSM subscribers. GPRS aims at making efficient use of GSM radio resources for bursty packet data transfer. This is in contrast to conventional circuit switched data services currently available in GSM. Presently, the GPRS core network (CN) is based on GPRS Tunneling Protocol (GTP) using the well known User Datagram Protocol/Internet Protocol (UDP/IP) or Transmission Control Protocol/Internet Protocol (TCP/IP) network which supports only best-effort service. A more detailed description of GTP is found in ETSI Standard GSM 09.60, Release 1998, entitled "General Packet Radio Service (GPRS): GPRS Tunneling Protocol (GTP) Across The Gn And Gp Interface," the teachings of which are incorporated herein by this reference.

A portion of a typical GPRS system 100 is illustrated in FIG. 1. The core network 102, 104 (which may comprise, as shown, multiple IP networks coupled together via a gateway 103) is the primary transport mechanism in the GPRS system 100. GPRS introduces two new GPRS Support Nodes (GSNs), namely one or more Serving GPRS Support Nodes (SGSN) 112–116 and one or more Gateway GPRS Support Nodes (GGSN) 108–110, into the GSM architecture in order to support packet data services. Each SGSN 112–116 maintains the mobility context for mobile stations (MS) 122 (only one shown) and also performs authentication procedures. Any given SGSN 112 is coupled to a Base Station Subsystem (BSS) 118 over a frame relay network on one side and to various GGSNs 108–110 over the core network 102, 104 on the other side. Each BSS 118 is in turn coupled to a Mobile Switching Center (MSC) 120 that allows communication with the rest of the GSM circuit-switched architecture. Each BSS 118 supports wireless communications with each MS 122 within its coverage area. Each GGSN 108–110 acts as a gateway to public data networks 106, such as the Internet. Note that the core network 102, 104 typically comprises a plurality of IP-based intermediate nodes, e.g., routers, which support the communication paths within the core network 102, 104.

As currently specified, data packets are transported between a SGSN and GGSN using IP tunnels, as known in the art. For example, a given GGSN 108 encapsulates an IP packet destined to the MS 122 into another IP packet after attaching a GTP header to it. The outer (or encapsulating) IP header has the serving SGSN's 112 (i.e., the one that maintains the current mobility context for the MS) IP address as the destination address. The encapsulated packet is then forwarded through the CN 102 using hop-by-hop forwarding. At the serving SGSN 112, the outer IP header is stripped. The serving SGSN 112 uses the GTP header to forward the packet to the MS 122 via the appropriate BSS 118 using link layer procedures, i.e., over a radio access bearer. The GPRS Tunneling Protocol implemented at each of the SGSN 112–116 and GGSN 108–110 is responsible for performing these tasks of encapsulation and mapping onto an appropriate radio access bearer. Packet Data Protocol (PDP) is used to perform signaling tasks of GTP. A more detailed depiction of the various communication protocols used in current GPRS systems is illustrated in FIG. 2. In particular, a protocol "stack" is shown at each device inclusively between the MS and GGSN. Based on the Open System Interconnection (OSI) model, each layer of the respective protocol stacks represents an additional layer of functionality. Physical communication, e.g., modulation protocols and the like, occurs at the lowest layer, whereas the most functionality occurs at the top. Each of the various layers illustrated in FIG. 2 are well known in the art and are discussed in greater detail in ETSI Standard GSM 03.60, Release 1997, entitled "General Packet Radio Services (GPRS): Service Description," the teachings of which are incorporated herein by this reference. The solid lines between layers indicate peering relationship (i.e., residing at the same protocol layer) between protocol layers. Note, for example, that GTP is terminated in the SGSN and GGSN. Also note that there are typically a number of intermediate nodes between the GGSN and SGSN, although only a single intermediate node is illustrated in FIG. 2 for clarity.

In contrast to the single (best effort) level of service provided by the GPRS CN, it is anticipated that varying levels of service will become a requirement. For example, the so-called Universal Mobile Telecommunications System (UMTS), based on the GPRS network architecture described above, defines four different quality of service (QoS) or traffic classes as defined in 3 GPP Technical Specification 23.107, Release 1999, entitled "$3^{rd}$ Generation Partnership Project (3 GPP): Technical Specification Group Services and System Aspects: QoS Concepts and Architectures," the teachings of which are incorporated herein by this reference. These classes are the conversational class, the streaming class, the interactive class and the background class. The main distinguishing factor between these classes is the delay sensitivity of each type of traffic. The conversational class is meant for very delay sensitive traffic, whereas the background class is the most delay insensitive traffic class. The conversational and streaming classes are mainly intended to be used to carry real-time traffic flows. Conversational real-time services, like video telephony, are the most delay sensitive applications and those data streams should be carried in the conversational class. The interactive and background classes are mainly meant to be used by traditional Internet applications like World Wide Web (WWW), Email, Telnet, File Transfer Protocol (FTP) and News. The main difference between the interactive and background classes is that the interactive class is mainly used by interactive applications, e.g. interactive Email or interactive Web browsing, whereas the background class is meant for background traffic, e.g. background download of Emails or background file downloading. Separating interactive and background applications ensures responsiveness of the interactive applications. Traffic in the interactive class has higher priority in scheduling than traffic in the background class, so background applications use transmission resources only when interactive applications do not need them. Compared to conversational and streaming classes, both provide better error rate by means of channel coding and retransmission available due to the looser delay requirements. As more and more communication services (besides data) are being offered over IP, it becomes critical for the GPRS CN to be able to support UMTS QoS classes.

Other researchers have recognized the need for IP QoS provisioning in the GPRS CN. In particular, in "Quality of Service Framework in GPRS and Evolution towards UMTS," M. Puuskari, 3 rd European Personal Mobile Communication Conference, March 1999; "Supporting IP QoS in the General Packet Radio Service," Priggouris et al., IEEE Network, pp. 8–17, September/October 2000; and "An Integrated QoS Architecture for GSM Networks," Mikkonen et al., International Conference on Universal Personal Communication (ICUPC), vol. 1, pp. 403–407, October 1998, the authors have discussed the possibility of using Integrated Services (IntServ) QoS mechanism in the CN. The proposal in the Priggouris et al. paper uses RSVP messaging between SGSN and GGSN to establish QoS enabled GTP tunnels across the CN. In the Mikkonen et al. paper, the authors propose the use of GSM circuit switched services for the guaranteed service class of IntServ, and the GPRS packet switched services for the controlled load class of IntServ. However, the IntServ QoS mechanism is notably complex and has poor scalability in large networks. Further, when an MS changes its serving SGSN due to mobility, the QoS-enabled GTP tunnels have to be re-established between the GGSN and the new SGSN. In the IntServ approach stated above, RSVP messaging and resource reservation has to be reinitiated between the GGSN and the new SGSN. This increases the complexity of IntServ approach and adds more latency to the handover procedure. The possibility of using Differentiated Services (DiffServ) approach rather than IntServ approach is also briefly discussed in the above references.

Therefore, it would be advantageous to provide a technique that supports various QoS classes across the GPRS core network in a scalable and efficient way.

SUMMARY OF THE INVENTION

The present invention provides a technique for supporting QoS classes across a GPRS core network. In a preferred embodiment, a combination of multi-protocol label switching (MPLS) and DiffServ techniques is used to implement QoS-enabled GTP-like tunnels. MPLS is a label-based forwarding technique that has excellent scalability properties and, more importantly, is a very useful tool for traffic engineering in IP core networks. Aggregate GTP-like tunnels, called Label Switched Paths (LSPs), are established for different types of traffic across the CN during the traffic-engineering phase. This gives considerable control over the routes that the packets of various classes take between SGSN and GGSN. The queuing and forwarding treatment offered to packets at internal nodes along these routes within the CN depends on the DiffServ per-hop behavior (PHB) that the packet is assigned to at the edge of the CN, i.e., at SGSN or GGSN. In one embodiment of the invention, PDP messaging that occurs at the time of activation of PDP context can be used to assign the corresponding packet stream to a particular LSP and PHB. When an MS changes its serving SGSN due to mobility, only a change to the label mapping context at a GGSN is required, thereby allowing subsequent packets targeted to the MS to be routed to a new SGSN. In this manner, SGSN handoff does not require per-flow QoS signaling across the CN, and hence it allows faster, QoS-enabled re-routing of packets to the new SGSN. These and other advantages will be more apparent in light of the detailed description below.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

Figure 1:
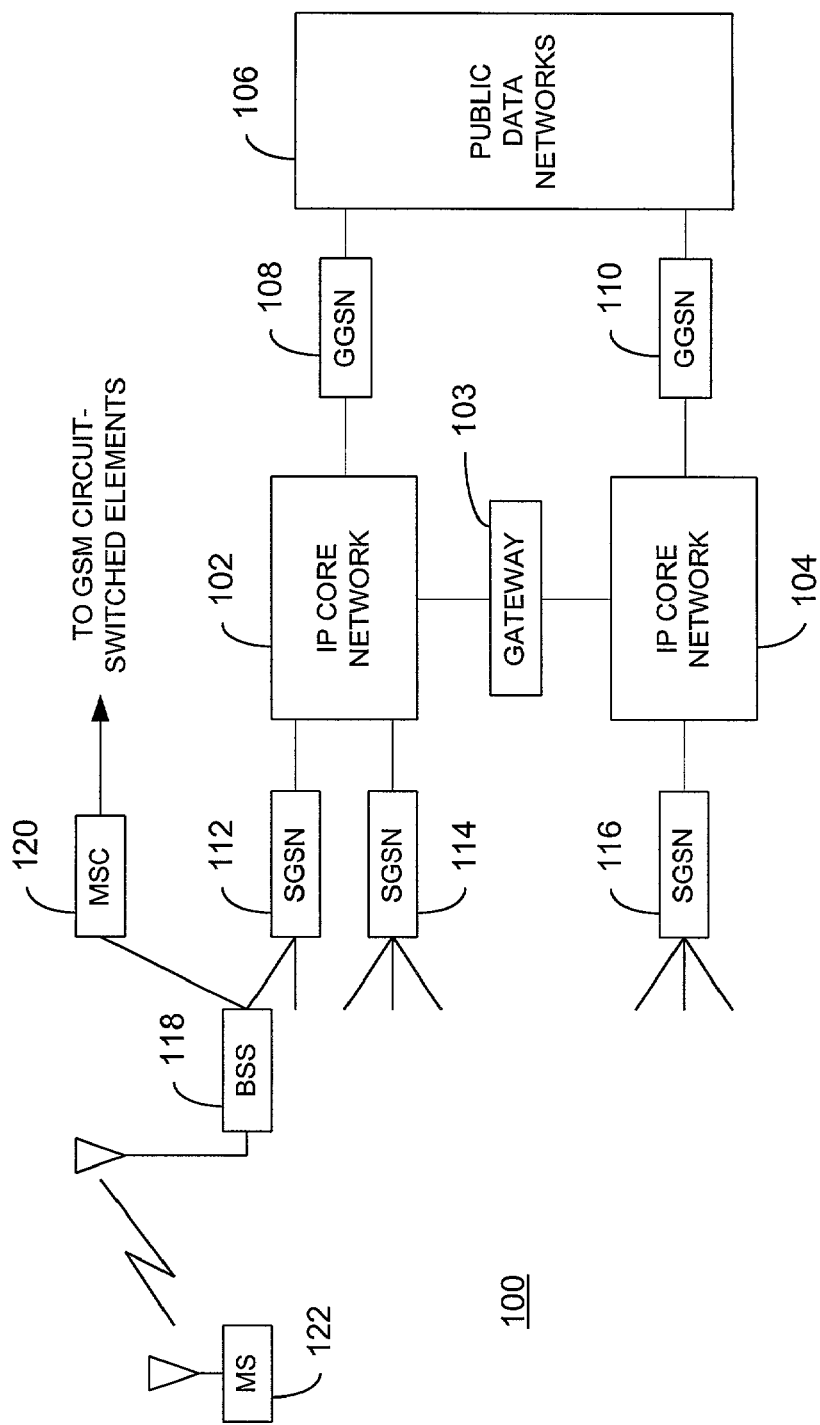
FIG. 1 is a block diagram of a portion of a GPRS communications system in accordance with the prior art and that may benefit from application of the present invention.
Figure 2:
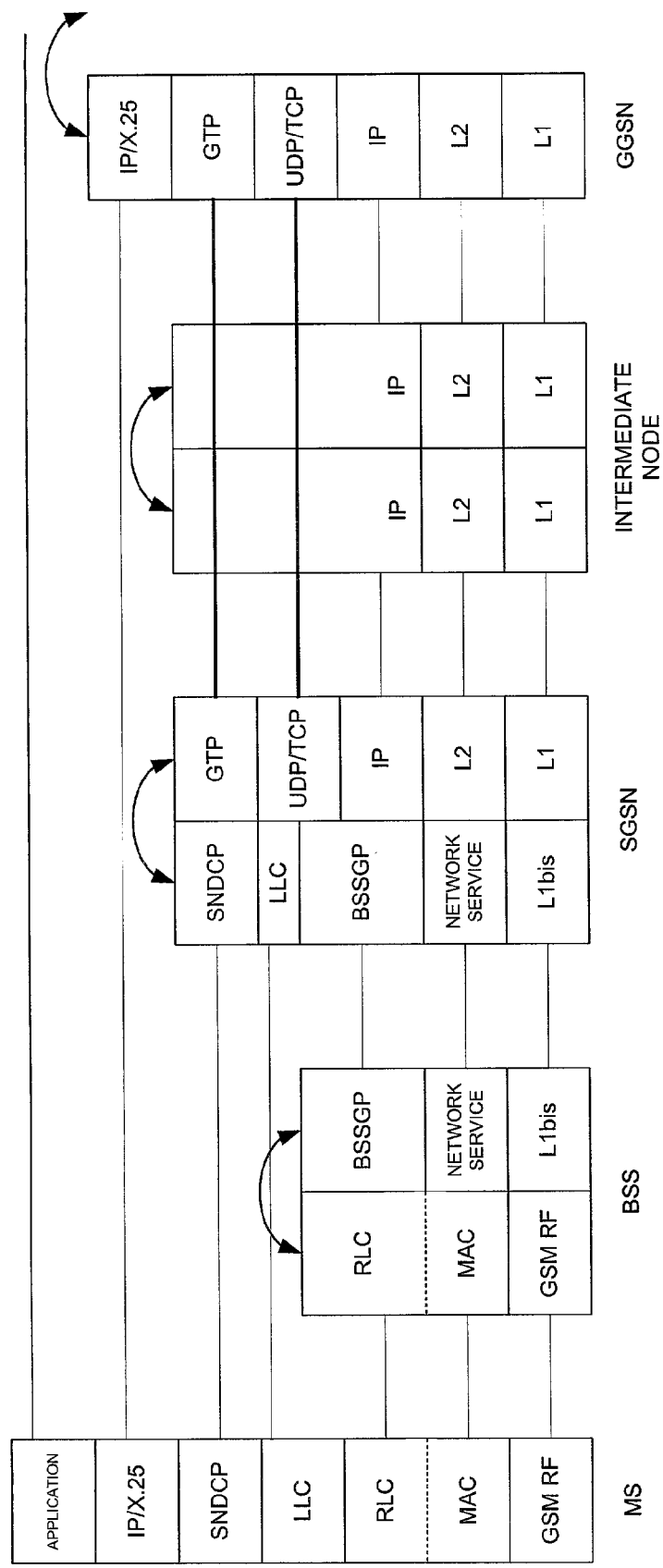
FIG. 2 illustrates protocol stacks used in GPRS communication systems in accordance with prior art techniques.
Figure 3:
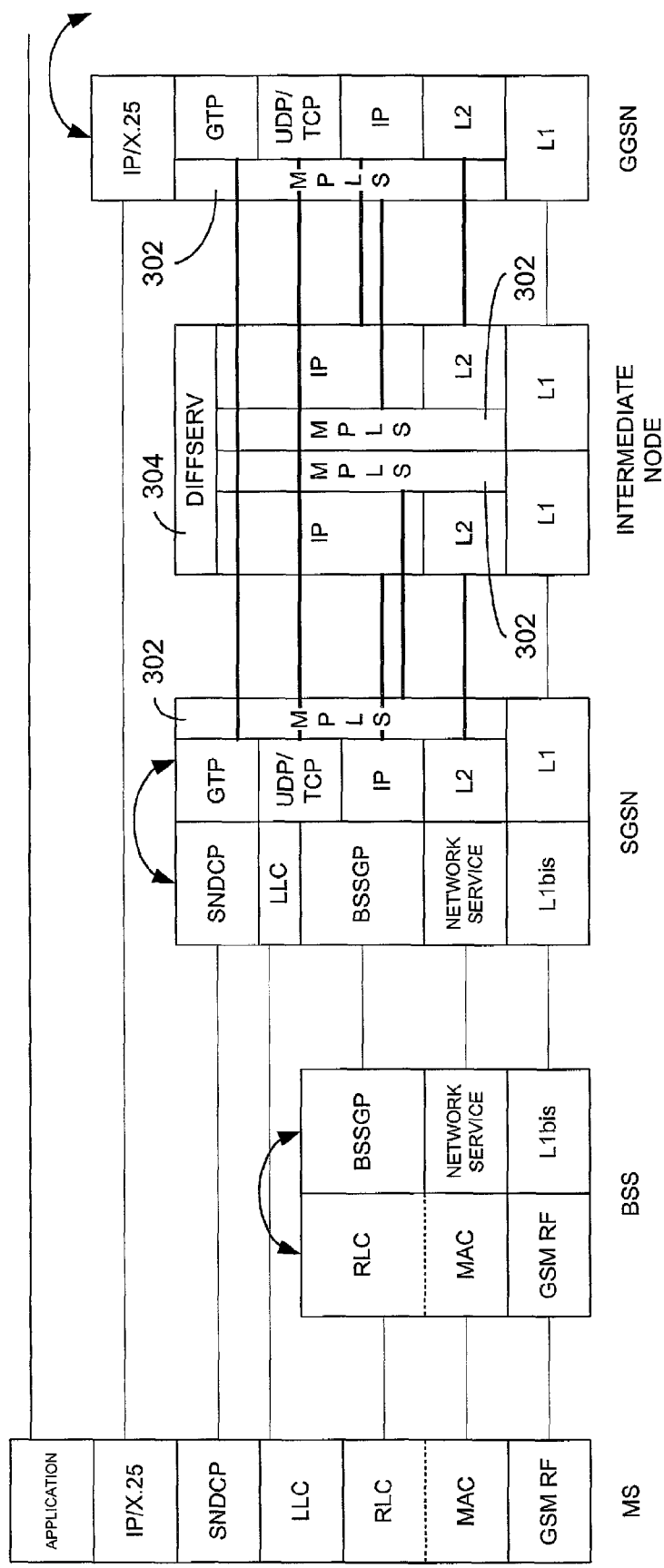
FIG. 3 illustrates protocol stacks used in GPRS communication systems in accordance with the present invention.

The present invention may be more fully described with reference to FIGS. 3–4. FIG. 3 illustrates protocol stacks in accordance with the present invention. In particular, the protocol stacks of FIG. 3 are largely the same as those shown in FIG. 2, with the addition of multi-protocol label switching (MPLS) layers 302 to the GGSN, SGSN and intermediate nodes, and a Differentiated Services (DiffServ) layer 304 to the intermediate nodes. Note that MPLS 302 can co-exist with conventional GTP-TCP/UDP-IP stacks. As in FIG. 2, only a single intermediate node is illustrated for the sake of clarity. Implementation of the MPLS and DiffServ layers illustrated in FIG. 3 are well known in the art, as described in greater detail below. Generally, the layers illustrated in FIG. 3 are implemented using stored software routines executed by a suitably programmed processing platform, such as a personal computer, microprocessor, microcontroller, digital signal processor or the like or combinations thereof. The particular advantages and uses of MPLS and DiffServ in the context of the present invention are further described below.

MPLS is a packet forwarding technique being standardized by the Internet Engineering Task Force (IETF). As of the filing date of the present application, the most recent definition of MPLS functionality is found in the IETF work in progress draft entitled "Multiprotocol Label Switching Architecture", Rosen et al., July 2000 accessible at http://www.ietf.org/internet-drafts/draft-ietf-mpls-arch-07.txt, the teachings of which are incorporated herein by this reference. MPLS uses labels to make forwarding decisions at the network nodes, in contrast to the traditional destination-based hop-by-hop forwarding in IP networks. In MPLS, the space of all possible forwarding options in a network domain is partitioned into so-called "forwarding equivalence classes" (FECs). For example, all the packets destined for a given egress may belong to the same FEC. Packets are labeled at an ingress node (i.e., an SGSN or GGSN) depending on the FEC to which they belong. Each of the intermediate nodes uses the label of an incoming packet to determine its next hop, and also performs "label swapping," i.e., replaces the incoming label with the new outgoing label that identifies the respective FEC for the downstream node. The label swapping maps corresponding to each FEC are established using standard protocols such as the Reservation Protocol (RSVP) or the Constraint-based Routing Label Distribution Protocol (CR-LDP). Label-based forwarding techniques such as MPLS reduce the processing overhead required for routing at the intermediate nodes, thereby improving the packet forwarding performance of such nodes. Also, the label-merging procedure used by MPLS creates multipoint-to-point packet forwarding trees in contrast to a routing mesh in conventional network based on a similar paradigm, such as ATM networks. This reduces considerably the size of forwarding table at the intermediate nodes, thereby improving their scalability.

Another important capability that MPLS provides is that of constraint-based routing. That is, an ingress node can establish an explicit route through the network, rather than requiring each packet to inefficiently carry the explicit route. MPLS allows the explicit route to be carried (in the form of a label) because each label-switched path (LSP) is set up using standardized protocols such as RSVP or CR-LDP. The subsequent packets traversing this path are forwarded using packet labels. Such constraint-based routing is potentially useful for traffic engineering. For example, the service provider can provision LSPs for real-time traffic over the best path between ingress and egress, while routing best-effort traffic over sub-optimal paths. In the context of the present invention, packets falling within separate UMTS QoS classes (described above) and destined to different egress nodes (one of the SGSNs or GGSNs) may be associated with different FECs.

Referring again to FIG. 3, LSPs of required capacities are established for different traffic classes between SGSN and GGSN, during a traffic-engineering phase. Then, for example, an IP packet arriving at a GGSN from the Internet is first parsed to identify the FEC to which it belongs, and hence, the LSP over which it is to be forwarded through the CN. The fields in the packet header such as source/destination IP addresses, TCP/UDP port numbers, IPv6 flow label etc., can be used for parsing purposes, as described in greater detail below. The parsing context is programmed in the GGSN at the time of PDP context activation, also described in greater detail below. The GGSN attaches a label to this IP packet which then is used for forwarding (and label swapping) at the intermediate nodes in the CN. The label is stripped off at the SGSN. For example, a data packet destined to the MS may traverse a best-effort LSP through the CN, while a Voice-Over-IP packet destined to the same MS may follow another, low delay LSP.

As of the filing date of the present application, the most recent definition of DiffServ functionality is found in the IETF RFC 2475 entitled "An Architecture for Differentiated Services", Blake et al., December 1998 accessible at http://www.ietf.org/rfc/rfc2475.txt, the teachings of which are incorporated herein by this reference. The DiffServ QoS architecture is based on a model in which traffic entering a network domain is classified, possibly conditioned at the boundaries of the network domain and assigned to different behavior aggregates. A single DiffServ Code Point (DSCP) identifies each behavior aggregate. The process of marking packets with appropriate DSCPs at an edge node (e.g., SGSN or GGSN) is sometimes referred to as packet classification. A DSCP is included in the IP header of each packet at the ingress edge of the network domain. DiffServ proposes differentiation in the per-hop queuing and forwarding treatment received by packets at the routers within the network on the basis of DSCPs added to their headers at the ingress of the network. A set of packet classification rules defines each behavior aggregate or per-hop behavior (PHB) group. The IETF has standardized two groups of behavior aggregates, namely a single instance or class of expedited forwarding (EF), and four instances or classes of assured forwarding (AF) each including three drop-precedence levels. The actual policies used for marking, queuing and forwarding of packets at routers in DiffServ domain is a vendor-specific issue. The EF PHB group has been defined with the intention of providing leased line-like service using DiffServ. This is achieved by regulating the total rate of all the flows registered with the EF PHB class to be less than the service rate allocated to the EF PHB class at that node. Strict policing is enforced on the flows, and any non-conforming packets are dropped at the ingress itself. In general, policing is the process of throwing away packets that do not conform to a negotiated traffic profile. In the context of the GPRS CN of the present invention, the traffic profile is indicated to each GGSN (for downlink traffic) and SGSN (for uplink traffic) at the time of PDP context activation, described in greater detail below. The AF PHB group has provisions for classifying packets into different precedence levels. Three such levels have been specified and each level is associated with a drop precedence (DP), i.e., the expected precedence with which individual packets will be dropped, if necessary. Thus, each AF class has three DSCPs reserved, one for each DP level. The AF PHB group defines a relationship between these three precedence levels. If congestion occurs at a particular forwarding node, a packet with the lowest DP must have the lowest probability of being dropped. Likewise, a packet with the highest DP has the highest probability of dropping. Congestion control mechanisms must be used with the AF PHB class. Random Early Detection (RED), described in "Random Early Detection Gateways for Congestion Avoidance", S. Floyd and V. Jacobson, IEEE/ACM Transactions on Networking, pp. 397–413, Vol. 1, Issue 4, August 1993, has been proposed as one possible technique for congestion control. Other mechanisms with similar capabilities can be used as well. The congestion control mechanism maintains the relationship between different precedence levels.

As noted previously, the UMTS QoS specification describes four classes of traffic, namely the conversational, streaming, interactive and background classes. DiffServ can be used to support these UMTS QoS classes in the CN. Table 1 illustrates a preferred mapping of UMTS QoS classes to the various DiffServ PHB classes described above.

TABLE 1

| UMTS Traffic Class | PHB Class |
| --- | --- |
| Conversational | EF |
| Streaming | AF11, AF12, AF13 |
| Interactive | AF21, AF22, AF23 |
| Background | Best Effort |

Note that each of the AF PHBs in Table 1 is in the form of AFxy. The first suffix (x) indicates a particular AF PHB class to which the IP packet belongs, whereas the second suffix (y) indicates the properties within that class, such as conformance of that IP packet to a service level agreement (SLA), traffic handling priority etc.

As noted above, the process of selecting a DSCP for a given packet is sometimes referred to as packet classification. In practice, various parameters in an IP packet can be used for packet classification. For example, a Source or Destination IP address, and a Source or Destination port number can be used to uniquely identify the packets of particular an IP flow. While this technique is useful in many applications, the port number may not be always accessible, for example, where IPSec (a protocol that provides security for transmission of sensitive information over unprotected networks such as the Internet) is used or where port numbers may not be easily accessible, as in the case of Internet Protocol Version 6 (IPv6) packets. As another example, a Source or Destination IP address, a Protocol ID and a packet size may be used to differentiate between packets. This combination can get around knowing port numbers. However, this may not always result in the correct classification. Also, Protocol ID may not be readily available in IPv6 packets. In yet another example, a Source or Destination IP address and a Flow label may be used. This combination is particularly applicable to IPv6 packets, although schemes for negotiating flow label on an end-to-end basis need to be developed. An example is to negotiate a flow label on an end-to-end basis during Voice-Over-IP call establishment using Session Initiation Protocol (SIP).

As known in the art, it is noted that DiffServ can operate with or without MPLS. Thus, either Mpls or DiffServ or, preferably, both can be used to support various Qos levels within a GPRS network. When used in conjunction with MPLS, the packet classification function attendant to DiffServ also provides mapping of IP packets to appropiate MPLS paths (LSPs) through the CN. Regardless, the use of MPLS at the SGSN or GGSN and/or DiffServ at the intermediate nodes allows various QoS levels to be implemented in GPRS networks.

The Packet Data Protocol (PDP) is a signaling protocol used to establish contexts for different communication bearers in a UMTS network. Stated another way, PDP allows an MS to setup the necessary communication bearer resources within the GPRS network. The process of setting up appropriate communication bearers in the GPRS network is referred to as PDP context activation. In support of the present invention, it is necessary to program the appropriate packet classification contexts in the edge nodes of the CN (SGSN and GGSN) at the time of PDP context activation or modification. This may require a few modifications to the PDP messages; at a minimum, the PDP ACTIVATE and PDP MODIFIY messages should include information about the IP header fields to be used for packet classification. If the current PDP specification is used without any modifications, only packet classification based on IP addresses is possible. The semantics of PDP messaging with respect to MPLS and DiffServ as implemented by the present invention in the GPRS CN is further described below.

Figure 4:
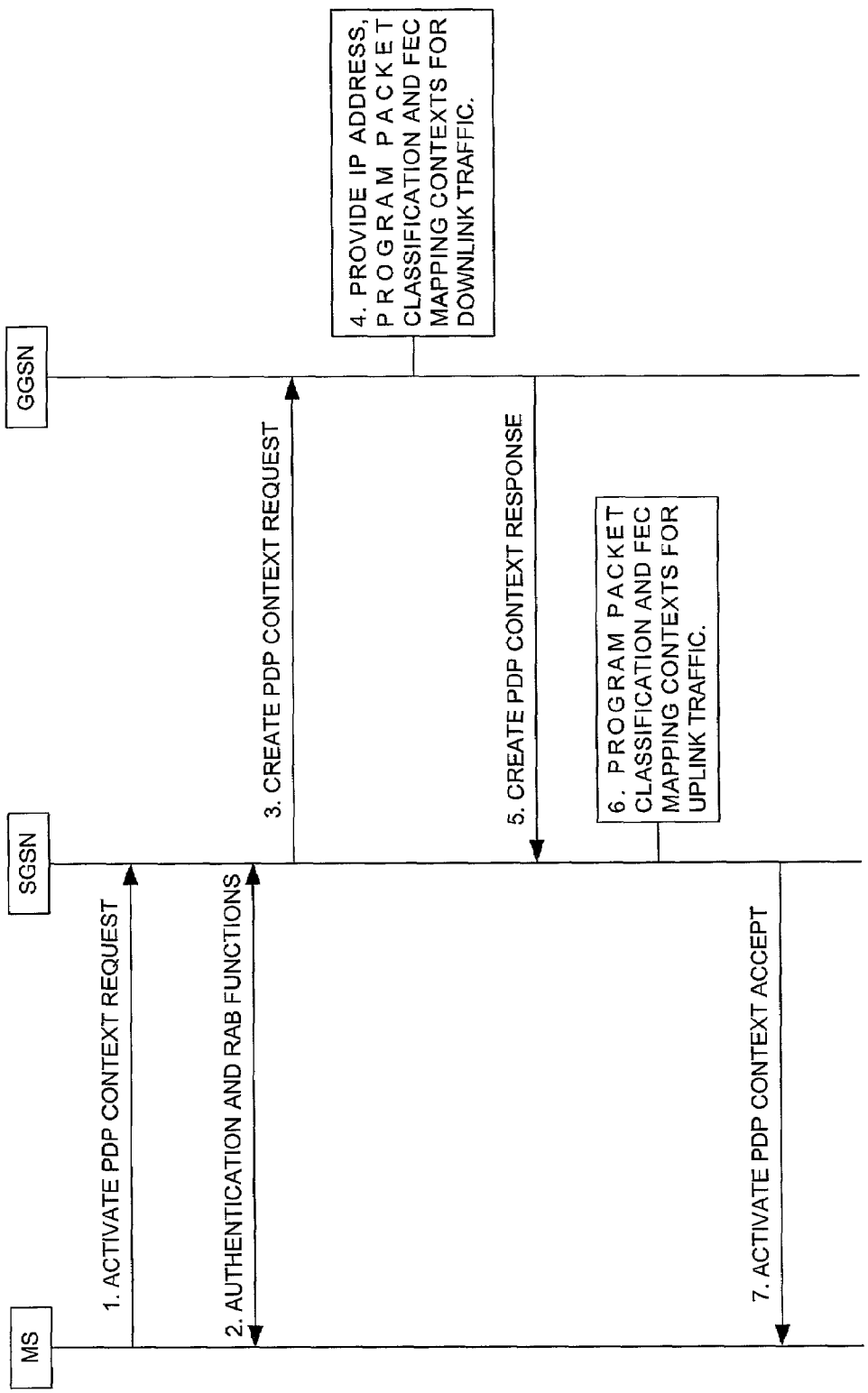
FIG. 4 illustrates an example of PDP used in conjunction with the techniques of the present invention.

Referring now to FIG. 4, the use of PDP in accordance with the present invention is described. The blocks (Steps 4 and 6) shown in FIG. 4 illustrate some of the processing unique to the present invention. First, an MS in STANDBY or READY state sends an Activate PDP Context Request (comprising fields for NSAPI, PDP Type, PDP Address, Access Point Name, QoS Requested, PDP Configuration Options) message to the SGSN. Each of these fields are well-known in the art and are described in greater detail in the ETSI Standard GSM 09.60 and ETSI Standard GSM 03.60 references cited above. The MS uses the PDP Address field to indicate whether it requires the use of a static or dynamic PDP address. The QoS Requested field indicates the desired QoS profile. The GPRS QoS profile, as described in the ETSI Standard GSM 03.60 reference, consists of fields like precedence, delay, reliability, mean and peak throughput. Based on the quantitative values provided in QoS profile, each SGSN and GGSN can map that profile to appropriate DiffServ class. Mapping of QoS parameters between GPRS and UMTS (i.e., conversational, streaming, interactive or background classes) is defined in the 3 GPP Technical Specification 23.107 reference cited above. The SGSN performs authentication and radio access bearer (RAB) setup procedures. If the MS requests a dynamic address, then the SGSN lets a GGSN allocate the dynamic address. The SGSN may restrict the requested QoS attributes based on the SGSN's capabilities, the SGSN's current load and the subscribed QoS profile. The SGSN sends a Create PDP Context Request (comprising fields for PDP Type, PDP Address, Access Point Name, QoS Negotiated, TID, Selection Mode, PDP Configuration Options) message to the affected GGSN. Again, each of these fields are well-known in the art and are described in greater detail in the ETSI Standard GSM 09.60 and ETSI Standard GSM 03.60 references cited above.

Upon receiving this message, the GGSN allocates (if required) a PDP address. The PDP address and QoS Negotiated are then used by GGSN to program the FEC mapping context and DiffServ packet classification context for downlink traffic (i.e., to the MS). Note that if the PDP message is modified to include additional information such as TCP/UDP port numbers that the MS will use, or IPv6 flow labels, these fields can also be used in programming FEC and packet classification contexts. The GGSN then returns a Create PDP Context Response to the SGSN. If dynamic address was requested, the GGSN includes the allocated PDP address (IP address) in the Create PDP Context Response. Upon receiving this message, the SGSN programs FEC mapping context and DiffServ packet classification context for uplink traffic. At this point, all the contexts required for MPLS and DiffServ are established in the SGSN and GGSN, and IP packets can be routed between the SGSN and GGSN over an LSP with appropriate packet forwarding treatment at the intermediate nodes of the CN. The SGSN selects a Radio Priority Level, as known in the art, based on QoS Negotiated, and returns an Activate PDP Context Accept (comprising fields for PDP Type, PDP Address, NSAPI, QoS Negotiated, Radio Priority Level, PDP Configuration Options) message to the MS. Yet again, each of these fields are well-known in the art and are described in greater detail in the ETSI Standard GSM 09.60 and ETSI Standard GSM 03.60 references cited above. In this manner, communications requiring a specific service level are fully supported by the GPRS network.

A particular benefit of the present invention is the ease with which handoffs between SGSNs may be handled. In prior art systems, when an MS roamed to a new area requiring it to associate with a new SGSN, the GTP tunnels established between the GGSN and the previous SGSN are discontinued and new GTP tunnels between the GGSN and the new SGSN must be established. In contrast, handoff is simplified in the present invention because only a label change is required at the GGSN to support downlink traffic.

Figure 6:
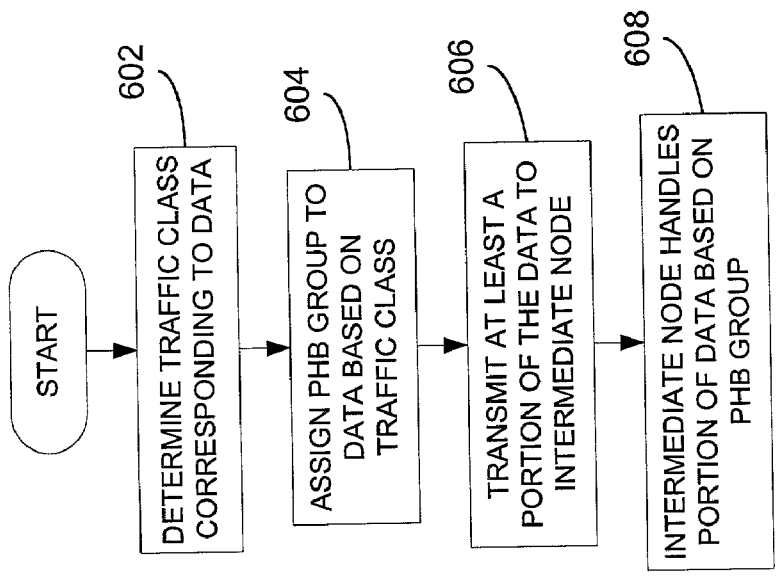
FIG. 6 is a flowchart illustrating another method in accordance with the present invention.
Figure 5:
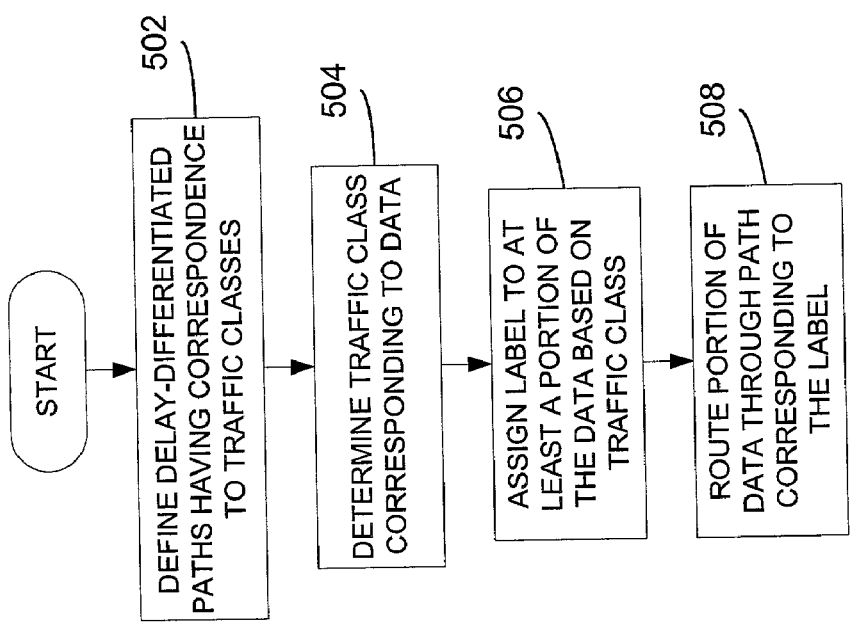
FIG. 5 is a flowchart illustrating a method in accordance with the present invention.

FIGS. 5 and 6 illustrate various implementations of the present invention based on the teachings above. Referring now to FIG. 5, at step 502, a plurality of delay-differentiated paths (e.g., LSPs) are defined between each of a plurality of GSNs. Each of the delay-differentiated paths has a correspondence to at least one traffic class. At step 504, incoming data (i.e., from an MS or public network) at an ingress GSN, such as an SGSN or GGSN, is assessed to determine a traffic class to which it corresponds. At step 506, the ingress GSN assigns a label to at least a portion of the data based on the determined traffic class. Preferably, the portion of the data comprises one or more packets suitable for transmission via an IP-based network. At step 508, the portion of the data is routed from the ingress GSN to an egress GSN via a first delay-differentiated path within the intermediate network (e.g., GPRS CN) based on the label assigned to the portion of data. In the context of the present invention, the term "label" is used in its broadest sense, and includes any label swapping that occurs during transit over the first delay-differentiated path. In this manner, the present invention advantageously incorporates the benefits of label-switched routing into the GPRS CN.

Referring now to FIG. 6, an alternative embodiment of the present invention is illustrated. At step 602, an ingress GSN, such as an SGSN or GGSN, assesses incoming data (i.e., from an MS or public network) to determine a traffic class corresponding to the incoming data. At step 604, a per-hop behavior group, preferably represented by a DiffServ Code Point, is assigned to the data based on the determined traffic. Thereafter, at step 606, at least a portion of the data is transmitted to an intermidiate node, preferably within a GPRS CN. Based on the per-hop behavior group, at step 608, the intermediate node handless the portion of the data. In the context of the present invention, the term "handle" encompasses all aspects of queuing and forwarding the portion of the data within the intermediate node. Additionally, although the process of FIG. 6 is illustrated in terms of a single intermediate node, it is understood that it is possible, even likely, that a number of intermediate nodes may handle data in the manner described in FIG. 6.

The present invention provides a technique for supporting various QoS levels in a GPRS network. In particular, MPLS and DiffServ are used to support UMTS QoS in the GPRS CN architecture. PDP signaling can be used to program relevant QoS contexts at the edge nodes (SGSN and GGSN) of the GPRS CN. In this manner, the present invention enables deployment of advanced IP QoS mechanisms in the CN that are backward compatible and require minimal or no changes to existing radio access network and mobile terminals. As a result, network providers can support evolution of customers' core networks to third generation (3G) networks in a cost-effective and efficient fashion. What has been described is merely illustrative of the application of the principles of the present invention. Those skilled in the art can implement other arrangements and methods without departing from the spirit and scope of the present invention.

What is claimed is:

1. In a General Packet Radio Service (GPRS) network comprising a plurality of GPRS Support Nodes (GSNs), including at least one Serving GPRS Support Node (SGSN) in communication with at least one Gateway GPRS Support Node (GGSN) via an Internet Protocol (IP)-based network comprising a plurality of intermediate nodes, a method for communicating data across the IP-based network according to a plurality of traffic classes, the method comprising steps of:

defining a plurality of delay-differentiated paths within the IP-based network between each of the at least one SGSN and each of the at least one GGSN, wherein each of the plurality of traffic classes has at least one delay-differentiated path of the plurality of delay-differentiated paths corresponding thereto;

determining, by an ingress GSN of the plurality of GSNs, a traffic class of the plurality of traffic classes corresponding to the data;

assigning, by the ingress GSN, a label to at least a portion of the data according to the traffic class to provide labeled data; and routing, by the ingress GSN to an egress GSN of the plurality of GSNs, the labeled data through a first delay-differentiated path of the plurality of delay-differentiated paths based on correspondence of the label to the first delay-differentiated path, wherein the step of routing further comprises:

transmitting, by the ingress GSN, the labeled data to one of the plurality of intermediate nodes;

handling, by the one of the plurality of intermediate nodes, the labeled data based on the traffic class, wherein each of the plurality of traffic classes has a unique correspondence to one of a plurality of per-hop behavior (PHB) groups, further comprising a step of assigning, by the ingress GSN, a PHB group of the plurality of PHB groups to the labeled data based on the traffic class, wherein the step of handling further comprises handling the labeled data according to the per-hop behavior group assigned to the labeled data, wherein the plurality of traffic classes comprises conversational, streaming, interactive and background traffic classes, and wherein the conversational class corresponds to an Expedited Forwarding PHB group, the streaming class corresponds to a First Assured Forwarding (AF1) PHB group, the interactive class corresponds to a Second Assured Forwarding (AF2) PHB group and the background class corresponds to a Third Assured Forwarding (AF3) PHB group.

2. The method of claim 1, wherein the step of defining further comprises defining the plurality of delay-differentiated paths based on Multi-Protocol Label Switching (MPLS) implemented within the at least one SGSN and the at least one GGSN.

3. The method of claim 1, wherein the ingress GSN comprises one of the at least one SGSN and the egress GSN comprises one of the at least one GGSN.

4. The method of claim 1, wherein the ingress GSN comprises one of the at least one GGSN and the egress GSN comprises one of the at least one SGSN.

5. The method of claim 1, wherein the portion of the data comprises a packet.

6. The method of claim 1, wherein the step of assigning further comprises assigning the PHB group to the labeled data based on any of a group consisting of: a source IP address, a destination IP address, a source port number, a destination port number, an IP protocol identification, a packet size and a flow label.

7. In a General Packet Radio Service (GPRS) network comprising a plurality of GPRS Support Nodes (GSNs), including at least one Serving GPRS Support Node (SGSN) in communication with at least one Gateway GPRS Support Node (GGSN) via an Internet Protocol (IP)-based network comprising a plurality of intermediate nodes, a method for communicating data across the IP-based network according to a plurality of traffic classes, the method comprising steps of:

defining a plurality of delay-differentiated paths within the IP-based network between each of the at least one SGSN and each of the at least one GGSN, wherein each of the plurality of traffic classes has at least one delay-differentiated path of the plurality of delay-differentiated paths corresponding thereto;

determining, by an ingress GSN of the plurality of GSNs, a traffic class of the plurality of traffic classes corresponding to the data;

assigning, by the ingress GSN, a per-hop behavior (PHB) group of a plurality of PHB groups to the data based on the traffic class;

transmitting, by the ingress GSN, a portion of the data to one of the plurality of intermediate nodes through a first delay-differentiated path of the plurality of delay-differentiated paths based on correspondence of the assigned PHB group to the first delay-differentiated path; and handling, by the one of the plurality of intermediate nodes, the portion of the data based on the PHB group, wherein the plurality of traffic classes comprises conversational, streaming, interactive and background traffic classes, and wherein the conversational class corresponds to an Expedited Forwarding PHB group, the streaming class corresponds to a First Assured Forwarding (AF1) PHB group, the interactive class corresponds to a Second Assured Forwarding (AF2) PHB group and the background class corresponds to a Third Assured Forwarding (AF3) PHB group.

8. The method of claim 7, wherein the portion of the data comprises a packet.

9. The method of claim 7, wherein step of assigning further comprises assigning the PHB group to the data based on any of a group consisting of: a source IP address, a destination IP address, a source port number, a destination port number, an IP protocol identification, a packet size and a flow label.

10. The method of claim 7, wherein the ingress GSN comprises one of the at least one SGSN and the egress GSN comprises one of the at least one GGSN.

11. The method of claim 7, wherein the ingress GSN comprises one of the at least one GGSN and the egress GSN comprises one of the at least one SGSN.

12. An improved General Packet Radio Service (GPRS) network of a type comprising a plurality of GPRS Support Nodes (GSNs) in communication with each other via an Internet Protocol (IP)-based network comprising a plurality of intermediate nodes, wherein the improved GPRS network is capable of supporting a plurality of traffic classes, the improvement comprising:

at least one Serving GPRS Support Node (SGSN) and at least one Gateway GPRS Support Node (GGSN) having a plurality of delay-differentiated paths within the IP-based network between each of the at least one SGSN and each of the at least one GGSN, wherein each of the plurality of traffic classes has at least one delay-differentiated path of the plurality of delay-differentiated paths corresponding thereto, wherein each of the at least one SGSN and each of the at least one GGSN further function to assign a per-hop behavior (PHB) group of a plurality of PHB groups to data belonging to a traffic class of the plurality of traffic classes, wherein the intermediate nodes handle the data according to the PHB group, wherein an ingress GSN routes to an egress GSN, the data through a first delay-differentiated path of the plurality of delay-differentiated paths based on correspondence of the PHB group to the first delay-differentiated path, and wherein the plurality of traffic classes comprises conversational, streaming, interactive and background traffic classes, and wherein the conversational class correspond and bacground to an Expedited Forwarding PHB group, the streaming class corresponds to a First Assured Forwarding (AF1) PHB group, the interactive class correspond to a Second Assured Forwarding (AF2) PHB group and the background class corresponds to a Third Assured Forwarding (AF3) PHB group.

13. The improved GPRS network of claim 12, wherein the step of assigning further comprises assigning the PHB group to the data based on any of a group consisting of: a source IP address, a destination IP address, a source port number, a destination port number, an IP protocol identification, a packet size and a flow label.

14. In a General Packet Radio Service (GPRS) network comprising a plurality of GPRS Support Nodes (GSNs), a method for communicating data across an IP-based network according to a plurality of traffic classes, the method comprising steps of:

determining, by an ingress GSN of the plurality of GSNs, a traffic class corresponding to the data; and assigning, by the ingress GSN, a label to at least a portion of the data according to the traffic class to provide labeled data;

routing the labeled data through one of a plurality of delay-differentiated paths based on a correspondence of the label to the one delay-differentiated path, handling the portion of the data based on per-hop behavior (PHB) group, and wherein the plurality of traffic classes comprises conversational, streaming, interactive and background traffic classes, and wherein the conversational class correspond and background to an Expedited Forwarding PHB group, the streaming class corresponds to a First Assured Forwarding (AF1) PHB group, the interactive class correspond to a Second Assured Forwarding (AF2) PHB group and the background class corresponds to a Third Assured Forwarding (AF3) PHB group.

* * * * *

UNITED STATES PATENT AND TRADEMARK OFFICE
CERTIFICATE OF CORRECTION

PATENT NO. : 7,023,820 B2
APPLICATION NO. : 09/751014
DATED : June 21, 2006
INVENTOR(S) : Hemant M. Chaskar It is certified that error appears in the above-identified patent and that said Letters Patent is hereby corrected as shown below:

Claim 12, Column 12, line 9-10:
   replace "correspond and bacground" with --corresponds--

Claim 12, Column 12, line 13:
   replace "correspond" with --corresponds--

Claim 14, Column 12, line 41-42:
   replace "correspond and background" with --corresponds--

Claim 14, Column 12, line 45:
   replace "correspond" with --corresponds--

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.        : 7,023,820 B2  
APPLICATION NO. : 09/751014  
DATED             : April 4, 2006  
INVENTOR(S)      : Hemant M. Chaskar Page 1 of 1

It is certified that error appears in the above-identified patent and that said Letters Patent is hereby corrected as shown below:

Claim 12, Column 12, line 9-10:
　　replace "correspond and bacground" with --corresponds--

Claim 12, Column 12, line 13:
　　replace "correspond" with --corresponds--

Claim 14, Column 12, line 41-42:
　　replace "correspond and background" with --corresponds--

Claim 14, Column 12, line 45:
　　replace "correspond" with --corresponds--

This certificate supersedes Certificate of Correction issued August 29, 2006.

Signed and Sealed this

Seventh Day of November, 2006

JON W. DUDAS  
*Director of the United States Patent and Trademark Office*